Nov. 5, 1968
F. GRACE
3,409,245
MOTOR DRIVEN FISHING REEL
Filed May 14, 1965
2 Sheets-Sheet 1
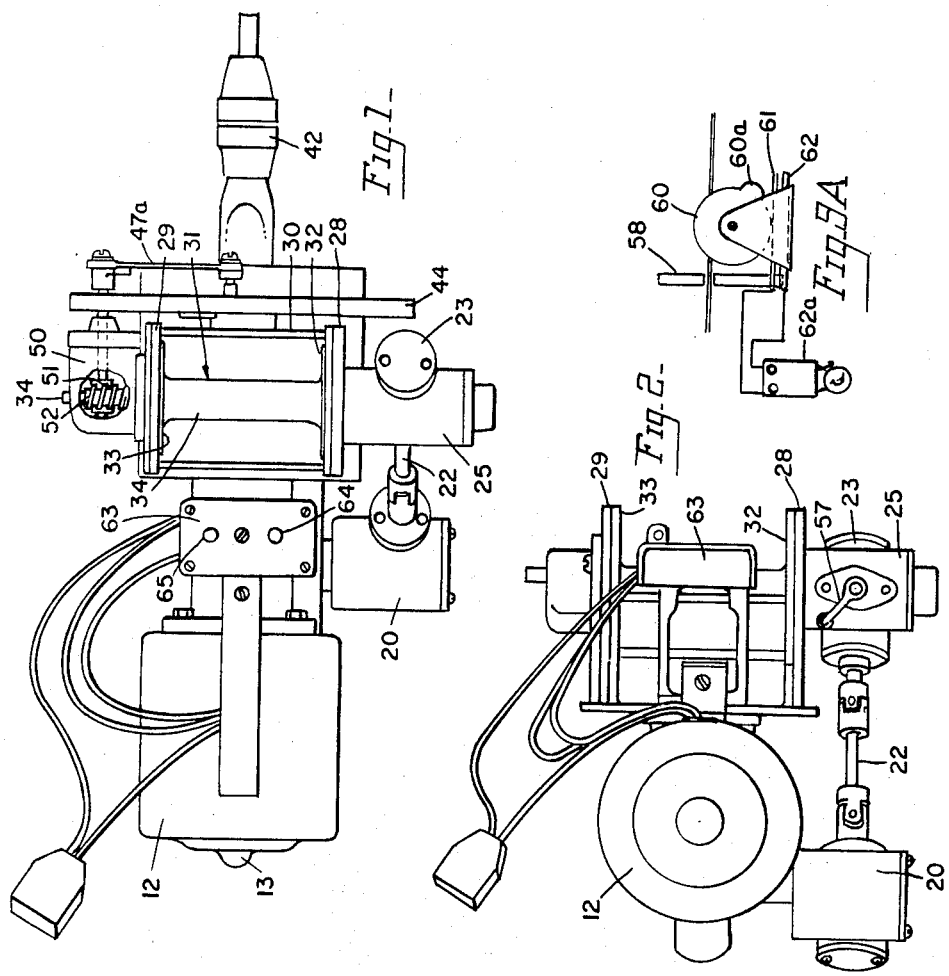
INVENTOR.
Freddie Grace

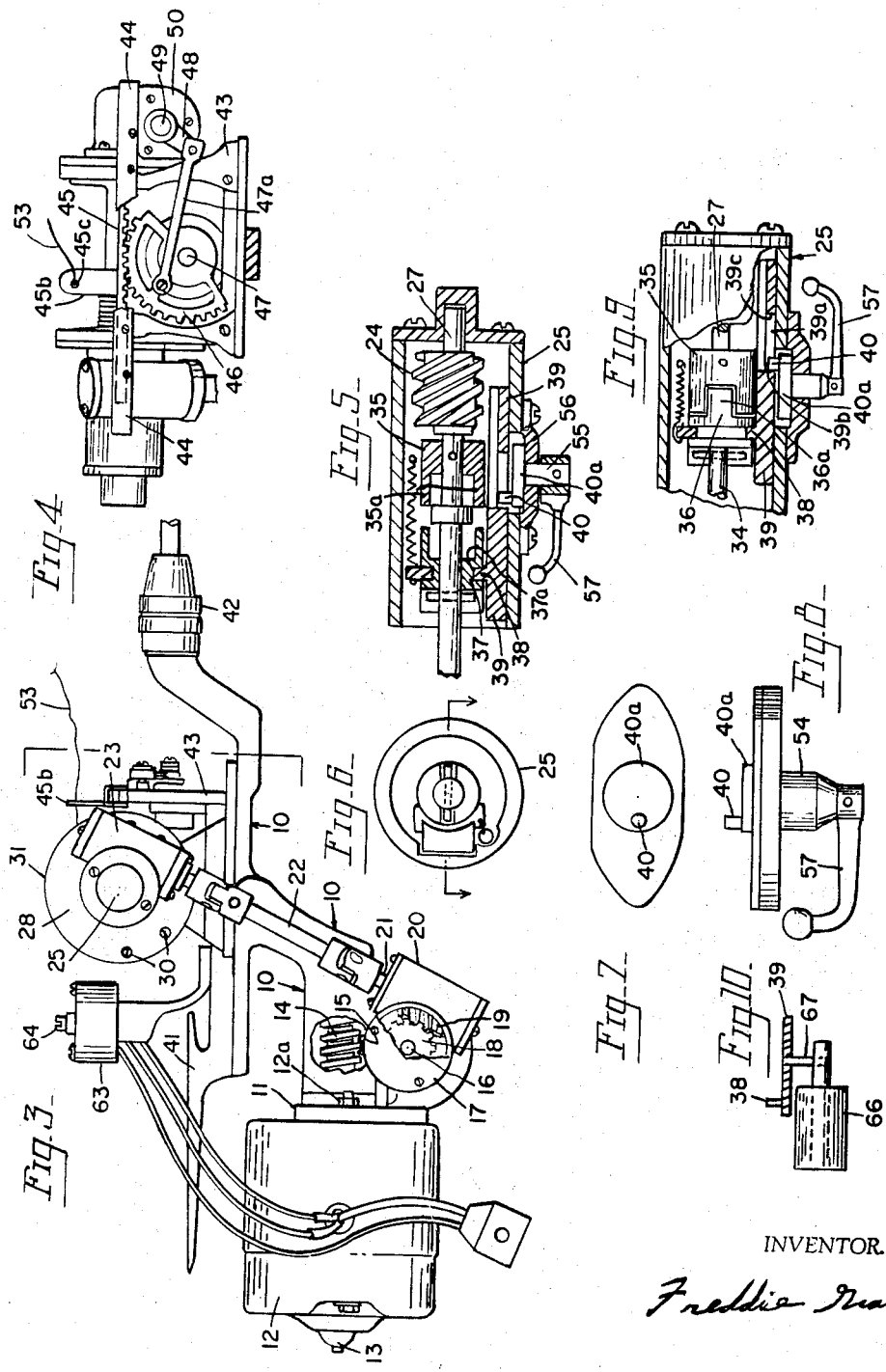

United States Patent Office 3,409,245
Patented Nov. 5, 1968

3,409,245
MOTOR DRIVEN FISHING REEL
Freddie Grace, 1246 Washington Ave.,
Bronx, N.Y. 10456
Filed May 14, 1965, Ser. No. 456,608
5 Claims. (Cl. 242—84.1)

ABSTRACT OF THE DISCLOSURE

A fishing rod driven by an electric motor connected to the spool by a transmission including a universal shaft and a manually operated, positive clutch. Rotation of the spool is transferred via linkage to reciprocate a level winding guide. Movement of the line operates a traction roller to close a signal switch.

This invention relates to a fishing reel and one of its objects is to provide a fishing reel with an electrical motor drive, which can be operated with six or twelve volt electrical current supplied by a ship, which can be controlled for a low speed and a high speed operation, by the manual operation of switch buttons.

Another object of the invention is the provision of a fishing reel with an automatic line spreader, which is coupled to the gear drive between the electrical motor and the fishing reel.

A further object of the invention is the provision of a manual clutch shift for freeing the fishing reel for casting or other purposes, when desired, regardless of the operation of the electrical motor at the time the clutch is released.

A still further object of the invention is the provision of a signal, which will operate when a fish bites on the baited hook and pulls on the fishing line.

Another object of the invention is to provide a motor operated fishing reel with a motor drive, which includes a primary worm drive between the motor and a transfer shaft, and a flexible or ball and socket jointed transfer shaft, which has driving connection with the reel through mating transfer gears.

With the above and other objects in view the invention comprises certain new and useful constructions, combinations and arrangements of parts, fully shown in the accompanying drawings and clearly described in the following specification thereof, and in which drawings, FIG. 1 is a top plan view of the motorized fishing reel.
FIG. 2 is a rear end view thereof.
FIG. 3 is a side view, with parts shown in section.
FIG. 4 is a detail side view of the gear mechanism which operates the line spreader.
FIG. 5 is a detail longitudinal sectional view through the manually released clutch which connects the terminal driven shaft with the fishing reel.
FIG. 6 is a detail sectional view thereof, showing the sliding plate which shifts the movable clutch element.
FIG. 7 is a side view of the plate which holds the lever which operates the clutch shifting slide.
FIG. 8 is a top edge view thereof.
FIG. 9 is another detail view of this clutch operator, showing the clutch elements engaged to transfer motor power to the fishing reel.
FIG. 9a is a detail of the signalling device of the present invention.
FIG. 10 is a detail view of the alarm arm, and its signal connection.

Referring to the accompanying drawings, which show the practical construction of my invention, 10 designates a frame bar, which is formed with a flanged head on its rear end at 11, on which the front end of an electrical motor 12 is secured by the bolts 12a. This frame bar 10 is hollow and the forward end of the shaft 13 of the armature of the motor is extended into the channel of this hollow bar 10 and is provided with a worm 14 which has driving connection with the teeth of the worm wheel 15, which is provided with a shaft 16 disposed at right angles to the armature shaft 13, and which turns in the housing 17, bolted to the bar 10.

The outer end of the shaft 16 carries a helical gear 18, which meshes with a mating helical gear 19, turning in the housing 20, and the shaft 21 of the gear 19 is connected to a universal shaft 22, which has driving connection with a shaft within housing 23 carrying a helical or worm gear (not shown) turning in the housing 23, to engage the helical or worm gear 24 which extends into the housing 23, and turns on the shaft 27 in said housing 25.

The housing 25 is rigidly connected with the end plate 28 which is coupled to the companion end plate 29, by the parallel metal rods 30. Between these confronting end plates the fishing reel 31 turns, and includes the reel end plates 32 and 33, and the connecting shaft 34. The shaft 34 is equipped with a fixed clutch element 35, having end teeth 35a, and on this shaft the movable clutch element 36 slides, and is formed with mating end teeth 36a. The clutch element 36 is formed with a collar 37 having a circumscribing groove 37a, which is engaged by the shift pin or lug 38, on the sliding plate 39, which works in the housing 25. The sliding plate 39 is formed with a longitudinal slot 39a, which provides a stop 39b at one end of the slot and a stop 39c at the opposite end of the slot. In this slot the eccentric shift pin 40 of the shift disc 40a operates to shift the slide, and thus shift the movable clutch element 36 toward and away from the fixed clutch element 35.

A longitudinal frame bar 41 is formed integral with the frame bar 10, or rigidly connected to it, and on the forward end of this bar a pole clamp and holder 42 is mounted. Forwardly of the fishing reel an upright frame 43 is supported indirectly on the frame bar 10, and on the upper end of the frame 43 an inverted U-shaped guiding bar 44 is mounted.

Within this frame bar 44 a gear rack 45 slides back and forth, and the teeth of this gear rack 45 face downwardly and are engaged by the teeth of the segmental gear 46, which is pivoted on the stud shaft 47, carried by the frame 43. This segmental gear is engaged by the end of the drive rod or link 47a, which is driven by the crank arm 48, on the shaft 49, which turns in the housing 50, and is provided with a gear 51, which is driven by a mating gear 52 on the shaft 34, to which the movable clutch element 36 is keyed to prevent relative rotation.

An upright arm 45b is rigidly connected with the gear rack 45, and is provided with a line guiding hole 45c, through which the fishing line 53 freely slides, and, of course, is connected with the reel shaft 34.

The shifting disc 40a is integral with a shaft 54, which turns in the bearing 55, formed integral with the plate 56, which is detachably connected with the housing 25, and the shaft 54 is provided with an operating arm 57, to enable the operator to rock this shaft and shift the movable clutch into driving connection with the fixed clutch, to wind the fishing line, or to release the reel from turning, so that the motor would no longer have driving control of it, and it can spin as the line is released for casting or to "play" any fish hooked on it.

The circuit through the electrical motor 12 is controlled by a manual switch 63, which is provided with a low speed button 64 and with a high speed button 65. The low speed button 64 controls a circuit through the motor, which includes a resistance, which reduces the amount of current fed to the electrical motor.

Fishing boats and sail propelled boats are supplied with current generators and batteries which operate on the six-volt current system or 12-volt current system, so that sufficient current is available for operating the electrical motor of my improved fishing reel.

In place of the manual clutch shifter, I may employ the magnetic clutch shifter shown in FIG. 10 of the drawings, which includes a solenoid 66, having a lateral pin 67 for operating the clutch slide.

I have tested my invention in actual service use and find that time is saved and that more exciting and more profitable fishing results, and that fewer fish are lost because of delays in winding the line in.

As shown in FIG. 9a the fishing line 53 may also pass through a guide 58 leading to a signalling device for actuating a signal which is responsive to the pull of a fish on the line. This device includes a friction wheel or reel 60, which is attached to the fishing pole by any suitable means and which is formed with a cam offset 60a designed to engage the upper metal contact strip 61 and to force the upper metal contact strip 61 into electrical contact with a second contact strip 62 attached to the fishing pole. An audible signal or electrical bell 62a is in circuit with the contact elements 61 and 62 and when this contact is maintained a signal will alert the fisherman that a fish is nibbling on the line. It is preferable that the fishing line be passed several times around the wheel or reel 60, the sinker weights on the line will maintain the line in traction engagement with the reel or wheel 60 so that when the fish pulls on the line the line will turn the reel or wheel 60 thus moving the cam offset 60a into pressure engagement with the movable upper contact strip and thereby close the signal circuit. A battery may be coupled in the circuit of the signal and contact so that the circuit will always be available.

The terms and expressions which are employed are used as terms of description; it is recognized, though that various modifications are possible within the scope of the invention claimed.

Having described my invention I claim as patentable:

1. A motor-driven fishing reel comprising a frame, a spool shaft rotatable in said frame, motor means, a universal shaft, first gear means connecting said motor means to one end of said universal shaft, second gear means connecting said spool shaft to the second end of said universal shaft, said second gear means including a shiftable clutch on said spool shaft to releasably make the connection between said spool shaft and universal shaft, reciprocal guide means carried by said frame, drive means connecting said spool shaft to said guide means, said drive means including a first gear member driving an upright arm provided with a line guide opening, a second gear member pivoted on said frame and meshing with said first gear member and linkage means connecting said second gear member to said spool shaft.

2. The invention of claim 1 wherein said linkage means includes a crank arm and shaft.

3. The invention of claim 1 wherein said first gear member is a movable rack gear having downwardly projecting teeth and said second gear member is a pivotally mounted segmented gear.

4. The invention of claim 1 wherein said universal shaft is disposed at approximately a right angle to said motor means.

5. The invention of claim 1 wherein said shiftable clutch includes a fixed clutch element having end teeth; a movable clutch element having mated teeth; and an eccentric shift pin adapted to move said movable clutch element toward and away from engagement with said fixed clutch element.

References Cited

UNITED STATES PATENTS

| | | | |
|---|---|---|---|
| 2,995,854 | 8/1961 | Dixon | 43—17 |
| 2,262,637 | 11/1941 | Fanshier | 43—21 |
| 2,354,530 | 7/1944 | McMahon | 242—84.44 |
| 2,541,876 | 2/1951 | Lockwood | 43—21 |
| 3,220,667 | 11/1965 | Madsen | 242—84.54 |

BILLY S. TAYLOR, *Primary Examiner.*